US010013582B2

(12) United States Patent
Neo et al.

(10) Patent No.: US 10,013,582 B2
(45) Date of Patent: Jul. 3, 2018

(54) SECURE DATA ENTRY DEVICE

(71) Applicant: VERIFONE INC., San Jose, CA (US)

(72) Inventors: Richard Hee Hock Neo, Singapore (SG); Thai Wee Ang, Singapore (SG)

(73) Assignee: VERIFONE, INC., San Jose, CA (US)

(*) Notice: Subject to any disclaimer, the term of this patent is extended or adjusted under 35 U.S.C. 154(b) by 171 days.

(21) Appl. No.: 14/584,085

(22) Filed: Dec. 29, 2014

(65) Prior Publication Data
US 2016/0188912 A1    Jun. 30, 2016

(51) Int. Cl.
H05K 5/00        (2006.01)
G06F 21/87       (2013.01)
H05K 5/02        (2006.01)
H05K 7/14        (2006.01)
G06F 21/83       (2013.01)
H01H 13/702      (2006.01)
(Continued)

(52) U.S. Cl.
CPC .............. G06F 21/87 (2013.01); G06F 21/83 (2013.01); H01H 13/702 (2013.01); H01L 23/576 (2013.01); H05K 1/0275 (2013.01); H05K 5/0217 (2013.01); H05K 5/0247 (2013.01); H05K 7/1427 (2013.01); *H01H 2239/032* (2013.01); *H01L 2924/0002* (2013.01); *Y04S 40/24* (2013.01)

(58) Field of Classification Search
CPC ....... G06F 21/83; G06F 21/87; H01H 13/702; H01H 2239/032; H01L 23/576; H05K 1/0275; H05K 5/0217; H05K 5/0247; H05K 7/1427
See application file for complete search history.

(56) References Cited

U.S. PATENT DOCUMENTS

| 3,940,637 | A | * | 2/1976 | Ohigashi | .............. | H03K 17/964 |
| | | | | | | 200/181 |
| 7,790,993 | B2 | | 9/2010 | Leon | | |
| 7,843,339 | B2 | | 11/2010 | Kirmayer | | |

(Continued)

FOREIGN PATENT DOCUMENTS

WO        84/04982 WO       12/1984

OTHER PUBLICATIONS

"FlexiForce® Standard Force & Load Sensors Model # A301", (Tekscan), Online, Retrieved from the Internet: http://www.tekscan.com/flexible-force-sensors retrieved on Sep. 30, 2013.

(Continued)

*Primary Examiner* — Yuriy Semenenko
(74) *Attorney, Agent, or Firm* — Hunton Andrews Kurth LLP

(57) ABSTRACT

A secure data entry device including a housing having at least one housing element, at least one additional element located within the housing, at least one force sensitive switch, employing at least one force sensitive film, disposed within the housing in force sensing engagement with at least one of the at least one housing element and the at least one additional element and arranged to sense tamper induced displacement thereof relative to at least another one of the at least one housing element and the at least one additional element and to provide an electrical output indicating tampering and a tampering responsive circuit, responsive to the electrical output indicating tampering.

11 Claims, 2 Drawing Sheets

(51) Int. Cl.
*H01L 23/00* (2006.01)
*H05K 1/02* (2006.01)

(56) References Cited

U.S. PATENT DOCUMENTS

| | | |
|---|---|---|
| 8,358,218 B2 | 1/2013 | Neo et al. |
| 8,461,990 B2 | 6/2013 | Ostermller |
| 8,595,514 B2 | 11/2013 | Mirkazemi-Moud et al. |
| 8,659,908 B2 * | 2/2014 | Adams ................ H05K 1/0275 |
| | | 361/765 |
| 8,760,292 B2 | 6/2014 | Neo et al. |
| 9,226,392 B2 * | 12/2015 | Chang ................ H05K 1/0275 |
| 2011/0215938 A1 * | 9/2011 | Neo ..................... G08B 21/185 |
| | | 340/635 |
| 2011/0248860 A1 | 10/2011 | Avital et al. |
| 2012/0180140 A1 | 7/2012 | Barrowman et al. |
| 2014/0091930 A1 | 4/2014 | Mirkazemi-Moud et al. |
| 2014/0240137 A1 | 8/2014 | Neo et al. |
| 2015/0242037 A1 * | 8/2015 | Pedder ..................... G01L 1/18 |
| | | 345/173 |

OTHER PUBLICATIONS

"FlexiForce® Standard Force & Load Sensors Model # A401", (Tekscan), Online, Retrieved from the Internet: http://www.tekscan.com/flexible-force-sensors retrieved on Sep. 30, 2013.
European Search Report dated May 12, 2016, which issued during the prosecution of Applicant's European App No. 15201685.
Extended European Search Report issued in corresponding European Application No. 15201685.3 dated May 12, 2016.

\* cited by examiner

SECURE DATA ENTRY DEVICE

REFERENCE TO RELATED APPLICATIONS

Reference is made to the following U.S. patents and U.S. patent publications, owned by assignee, the disclosures of which are hereby incorporated by reference, which are believed to relate to subject matter related to the subject matter of the present application:

U.S. Pat. Nos. 7,790,993; 7,843,339; 8,358,218; 8,461,990; 8,595,514; and 8,760,292; and U.S. Published Patent Application Nos. 2014/0091930 and 2014/0240137.

FIELD OF THE INVENTION

The present invention relates generally to secure keypad devices and more particularly to data entry devices having anti-tamper functionality.

BACKGROUND OF THE INVENTION

Various types of secure keypad devices are known in the art.

SUMMARY OF THE INVENTION

The present invention seeks to provide improved secure keypad devices.

There is thus provided in accordance with a preferred embodiment of the present invention a secure data entry device including a housing having at least one housing element, at least one additional element located within the housing, at least one force sensitive switch, employing at least one force sensitive film, disposed within the housing in force sensing engagement with at least one of the at least one housing element and the at least one additional element and arranged to sense tamper induced displacement thereof relative to at least another one of the at least one housing element and the at least one additional element and to provide an electrical output indicating tampering and a tampering responsive circuit, responsive to the electrical output indicating tampering.

In accordance with a preferred embodiment of the present invention the at least one force sensitive switch is arranged to sense tamper induced displacement between the at least one housing element and the at least one additional element located within the housing. Additionally or alternatively, the at least one force sensitive film includes a security assembly including at least two film layers.

In accordance with a preferred embodiment of the present invention, the security assembly includes a flexible PCB having formed thereon a plurality of force sensors.

Preferably, the security assembly also includes at least one of the following layers: a layer overlying the flexible PCB having formed thereon a plurality of force sensors, a flexible printed circuit board (PCB) on which is formed an anti-tampering protective mesh formed of a multiplicity of interconnected anti-tampering electrical conductors and a film having an adhesive coating on an underside thereof. More preferably, the security assembly also includes at least two of the following layers: a layer overlying the flexible PCB having formed thereon a plurality of force sensors, a flexible printed circuit board (PCB) on which is formed an anti-tampering protective mesh formed of a multiplicity of interconnected anti-tampering electrical conductors and a film having an adhesive coating on an underside thereof. Most preferably, the security assembly also includes the following layers: a layer overlying the flexible PCB having formed thereon a plurality of force sensors, a flexible printed circuit board (PCB) on which is formed an anti-tampering protective mesh formed of a multiplicity of interconnected anti-tampering electrical conductors and a film having an adhesive coating on an underside thereof.

In accordance with a preferred embodiment of the present invention the security assembly includes a film having an adhesive coating on an underside thereof and the film having an adhesive coating on an underside thereof includes electrical contacts coupled to leads of the plurality of force sensors.

Preferably, the at least one force sensitive switch includes at least one force sensor underlying a tamper responsive displaceable portion which, in the absence of tampering, engages the force sensor with at least a predetermined force.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

The present invention seeks to provide an improved security system for electronic devices, especially tamper-protected point of sale terminals and other devices containing sensitive information, such as personal data and encryption keys. For the purposes of the present description and claims, the term "point of sale terminals" includes, inter alia, PIN pads, electronic cash registers, ATMs, card payment terminals and the like.

The point of sale terminals preferably include a housing, an anti-tamper protected enclosure located within the housing and adapted to contain the sensitive information, anti-tamper protection circuitry located within the anti-tamper protected enclosure and case open switches electrically coupled to the anti-tamper protection circuitry for protecting against unauthorized access to the interior of the anti-tamper protected enclosure.

Preferably, a confidential data storage element is located within the anti-tamper protected enclosure. Additionally or alternatively a data entry element is also mounted in the housing.

Preferably, the anti-tamper protection circuitry is operative, in the event of unauthorized opening on the housing to perform at least one of the following actions: generate an alarm indication, disable the device and erase the sensitive data.

Figure 1A:
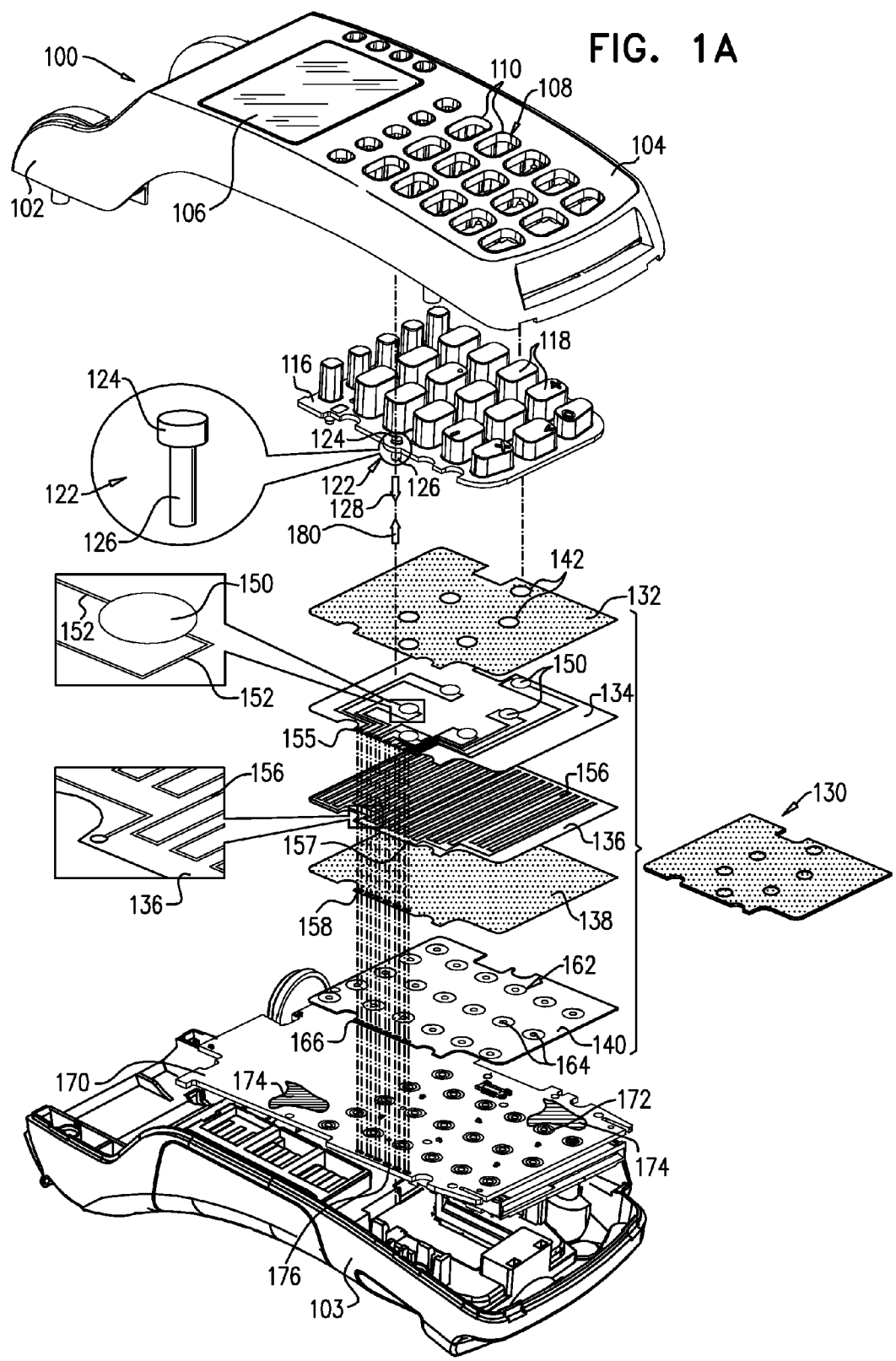
FIGS. 1A and 1B are simplified exploded view illustrations, taken in respective opposite directions, of part of a secure keypad device constructed and operative in accordance with a preferred embodiment of the present invention in a case open operative orientation.
Figure 1B:
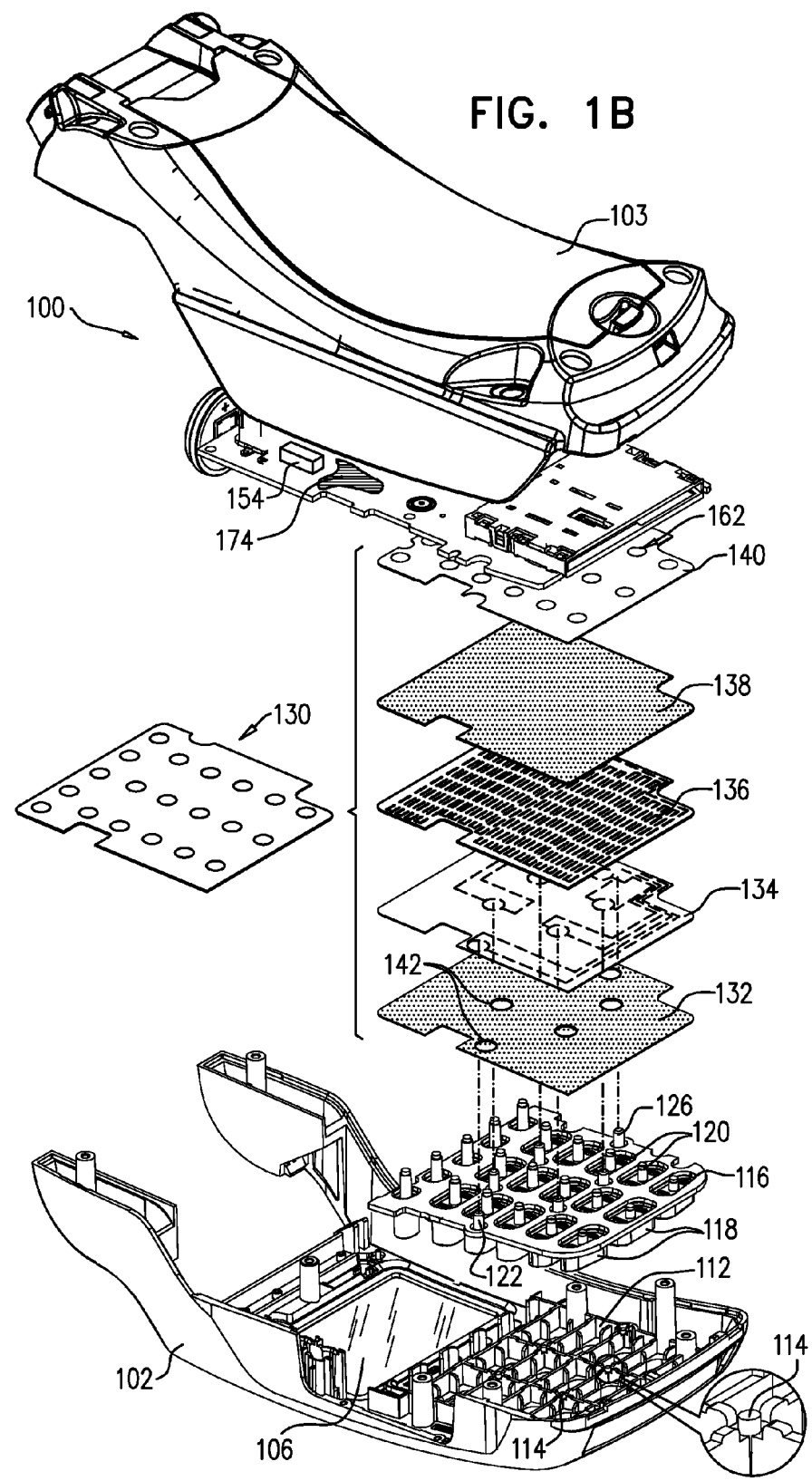

Reference is now made to FIGS. 1A & 1B, which illustrate a secure keypad device constructed and operative in accordance with a preferred embodiment of the present invention.

As seen in FIGS. 1A & 1B, there is provided a secure keypad device 100 including a housing element 102 which, together with a back panel 103, defines a keypad device housing. Housing element 102 includes, on a top surface 104 thereof, a display window 106, through which a display (not shown) may be viewed, and an array 108 of key apertures 110. The housing element 102 includes, on an underside surface 112 thereof, a plurality of spaced case open switch actuation protrusions 114.

A resilient key mat 116, preferably formed of resilient plastic or rubber, defines a plurality of depressible keys 118, preferably integrally formed with the remainder of key mat 116, which partially extend through key apertures 110. Underlying each of keys 118 is a key actuation protrusion 120. Disposed at multiple locations on key mat 116 are case open switch actuation responsive displaceable portions 122, each including a top facing protrusion 124, which is engaged by a corresponding case open switch actuation protrusion 114, and a bottom facing protrusion 126.

When the housing is closed, case open switch actuation protrusions 114 engage corresponding protrusions 124 and cause displacement of corresponding case open switch actuation responsive displaceable portions 122 in a direction indicated by an arrow 128. Opening of the housing retracts case open switch actuation protrusions 114 from corresponding protrusions 124 and enables displacement of corresponding case open switch actuation responsive displaceable portions 122 in a direction opposite to that indicated by arrow 128 as a result of resilience of the case open switch actuation responsive displaceable portions 122 and key mat 116.

It is a particular feature of the present invention that underlying key mat 116 there is provided a security assembly 130. Security assembly comprises at least two, and preferably five, film layers 132, 134, 136, 138 and 140, some or all which are typically joined together. Film layer 132 preferably comprises a layer formed of PET plastic material and functions as a stiffener for providing structural integrity to the security assembly. Film layer 132 is preferably formed with a plurality of apertures 142, which accommodate bottom facing protrusions 126 of case open switch actuation responsive displaceable portions 122, particularly when displaced in the direction of arrow 128, when the housing is closed.

Film layer 134 is preferably a flexible PCB having formed thereon a plurality of force sensors 150, whose electrical leads 152 are preferably coupled to tamper detection circuitry 154 via edge contacts 155.

Preferably, a total of six force sensors 150 are provided and arranged to each underlie a corresponding case open switch actuation responsive displaceable portion 122, such that, when the housing is closed, a corresponding protrusion 126 engages a force sensor 150 inasmuch as the case open switch actuation responsive displaceable portion 122 is in a downwardly-displaced operative orientation. Examples of suitable force sensors are Models A301, A401 and ESS301, commercially available from Tekscan, Inc. of South Boston, Mass., USA.

Layer 136 preferably comprises a flexible printed circuit board (PCB) on which is formed an anti-tampering protective mesh 156, formed of a multiplicity of interconnected anti-tampering electrical conductors. Protective mesh 156 is preferably connected to tamper detection circuitry 154 via edge contacts 157.

Layer 138 is preferably a film having an adhesive coating on an underside thereof and may include edge contacts 158.

Layer 140 is a key contact layer. Key contact layer 140 preferably includes an array 162 of raised resilient conductive domes 164, such as those commercially available from Snaptron, Inc. of Windsor, Colo., USA. Layer 140 is preferably also provided with edge contacts 166.

Underlying key contact layer 140 is an electrical circuit board 170, which functions, inter alia, as a key contact pad board, defining a plurality of pairs of adjacent electrical contact pads 172, each pair underlying a corresponding dome 164, preferably made of carbon, metal or combination of carbon/metal. The arrangement of key contact layer 140 and of electrical circuit board 170 is such that depression of a key 118 by the finger of a user causes dome 164 to establish electrical contact with and between a corresponding pair of electrical contact pads 172 lying thereunder and in registration therewith. When key 118 is not depressed, no electrical contact exists between dome 164 and a pair of corresponding electrical contact pads 172 or between the adjacent pads of the pair.

Electrical circuit board 170 preferably includes an anti-tampering grid 174 formed of a multiplicity of interconnected anti-tampering electrical conductors and connected to tamper detection circuitry 154 typically via electrical contacts 176. Electrical contacts 176 are preferably press-engaged with corresponding contacts 166 on key contact layer 140, contacts 158 on electrical circuit board 138, contacts 157 on electrical circuit board 136 and contacts 155 on electrical circuit board 134 and thus coupled to tamper detection circuitry 154.

When housing element 102 and back panel 103 are in a mutually closed orientation, case open switch actuation responsive displaceable portions 122 are in a downwardly displaced orientation, such that corresponding protrusions 126 engage corresponding force sensors 150 and provide a "housing closed" electrical output to tamper detection circuitry 154. Upon tampering and at least partial separation of housing element 102 and back panel 103 from each other, at least one case open switch actuation responsive displaceable portion 122 is displaced out of its downwardly displaced orientation, as in a direction indicated by an arrow 180, such that corresponding protrusion 126 no longer engages corresponding force sensor 150, at least not to the same extent. The force sensor 150 senses this change and provides a "housing opened" electrical output to tamper detection circuitry 154.

The embodiment described hereinabove senses tamper-induced separation between a housing element and another element of the secure data entry device. It is appreciated that there exist also embodiments of the invention which sense tamper-induced separation between two housing elements and other embodiments which sense tamper-induced separation between two elements of the secure data entry device, neither of which is a housing element.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

The invention claimed is:

1. A secure data entry device comprising:
   a housing, comprising a housing element and a back panel, the housing element having at least one case open switch actuation protrusion;
   at least one case open switch actuation responsive displaceable portion located within said housing and having a protrusion that is configured to be engaged by and displaced in a first direction by said at least one case open switch actuation protrusion;
   at least one force sensitive switch, employing at least one force sensitive film comprising at least one force sensor, disposed within said housing that is configured to be in engagement with said at least one case open switch actuation responsive displaceable portion when said at least one case open switch actuation responsive displaceable portion is engaged by and displaced in the first direction by said at least one case open switch actuation protrusion and arranged to sense a tamper induced displacement in a second direction of said at least one case open switch actuation responsive displaceable portion and to provide an electrical output indicating tampering, wherein said tamper induced displacement in the second direction causes at least a partial disengagement between said at least one force sensitive switch and said at least one case open switch actuation responsive displaceable portion; and a tampering responsive circuit, responsive to said electrical output indicating tampering.

2. The secure data entry device according to claim 1 and wherein said at least one force sensitive film comprises a security assembly comprising at least two film layers.

3. The secure data entry device according to claim 2 and wherein said security assembly comprises a flexible printed circuit board (PCB) having formed thereon said at least one force sensor.

4. The secure data entry device according to claim 3 and wherein said security assembly also comprises at least one of the following layers:

a layer overlying said flexible PCB having formed thereon said at least one force sensor;

a flexible PCB on which is formed an anti-tampering protective mesh formed of a multiplicity of interconnected anti-tampering electrical conductors; and a film having an adhesive coating on an underside thereof.

5. The secure data entry device according to claim 3 and wherein said security assembly also comprises at least two of the following layers:

a layer overlying said flexible PCB having formed thereon said at least one force sensor;

a flexible PCB on which is formed an anti-tampering protective mesh formed of a multiplicity of interconnected anti-tampering electrical conductors; and a film having an adhesive coating on an underside thereof.

6. The secure data entry device according to claim 3 and wherein said security assembly also comprises the following layers:

a layer overlying said flexible PCB having formed thereon said at least one force sensor;

a flexible PCB on which is formed an anti-tampering protective mesh formed of a multiplicity of interconnected anti-tampering electrical conductors; and a film having an adhesive coating on an underside thereof.

7. The secure data entry device according to claim 3 and wherein: said security assembly comprises a film having an adhesive coating on an underside thereof; and said film having an adhesive coating on an underside thereof comprises electrical contacts coupled to a lead of said at least one force sensor.

8. The secure data entry device according to claim 3 and wherein said at least one force sensor underlies a tamper responsive displaceable portion which, in the absence of tampering, engages said at least one force sensor with at least a predetermined force.

9. The secure data entry device according to claim 2 and wherein said at least one force sensor underlies a tamper responsive displaceable portion which, in the absence of tampering, engages said force sensor with at least a predetermined force.

10. The secure data entry device according to claim 1 and wherein said at least one force sensor underlies a tamper responsive displaceable portion which, in the absence of tampering, engages said force sensor with at least a predetermined force.

11. The secure data entry device according to claim 1 and wherein the at least one force sensor comprises a plurality of force sensors.

* * * * *